Figure 1:
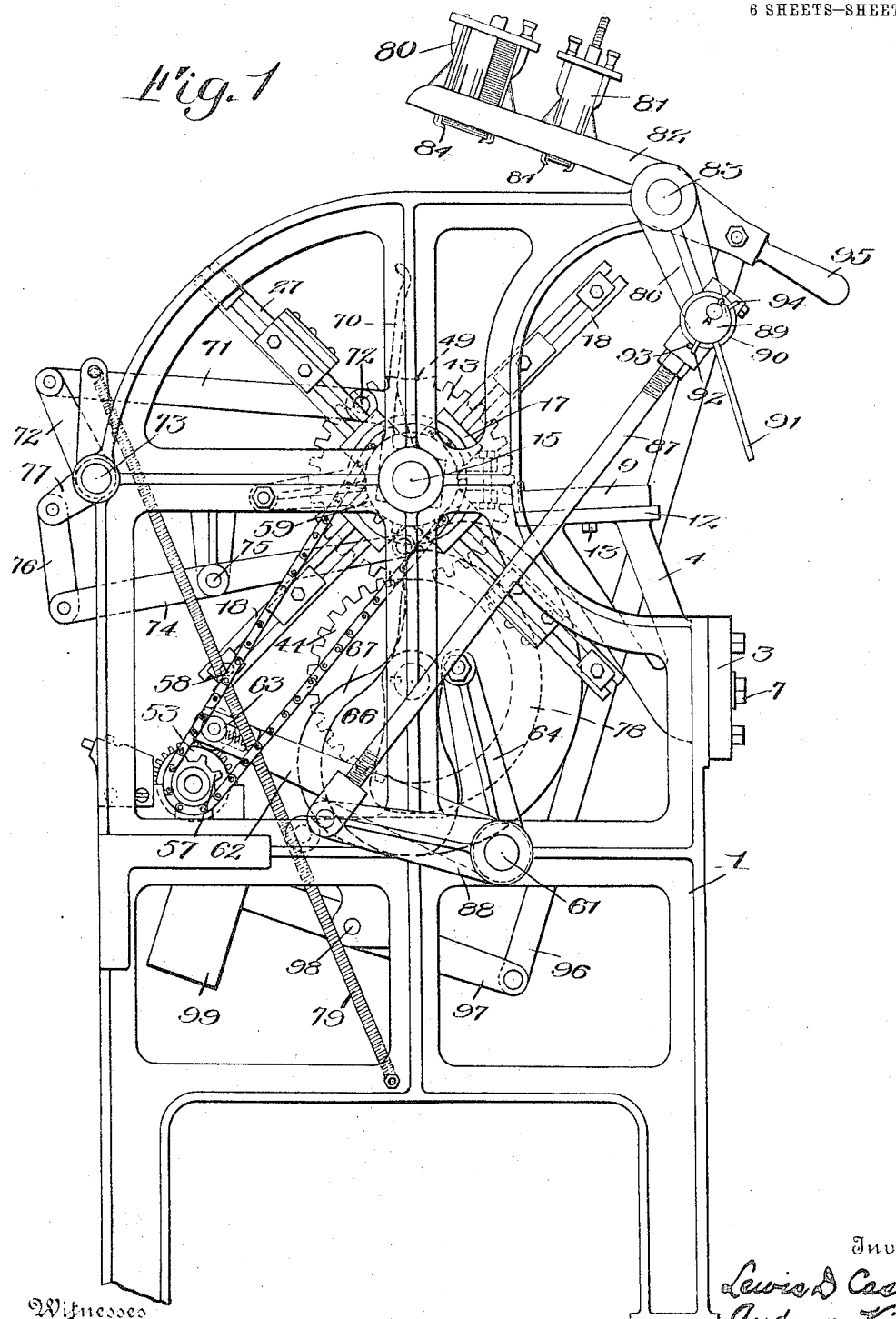

L. D. CASTOR & A. KIEFER.
LABELING MACHINE.
APPLICATION FILED APR. 20, 1912.

1,106,925.

Patented Aug. 11, 1914.

6 SHEETS—SHEET 1.

Witnesses
L. M. Simms
A. M. Whitmore

Inventors
Lewis D. Castor
Andrew Kiefer
By H. H. Simms
Their Attorney

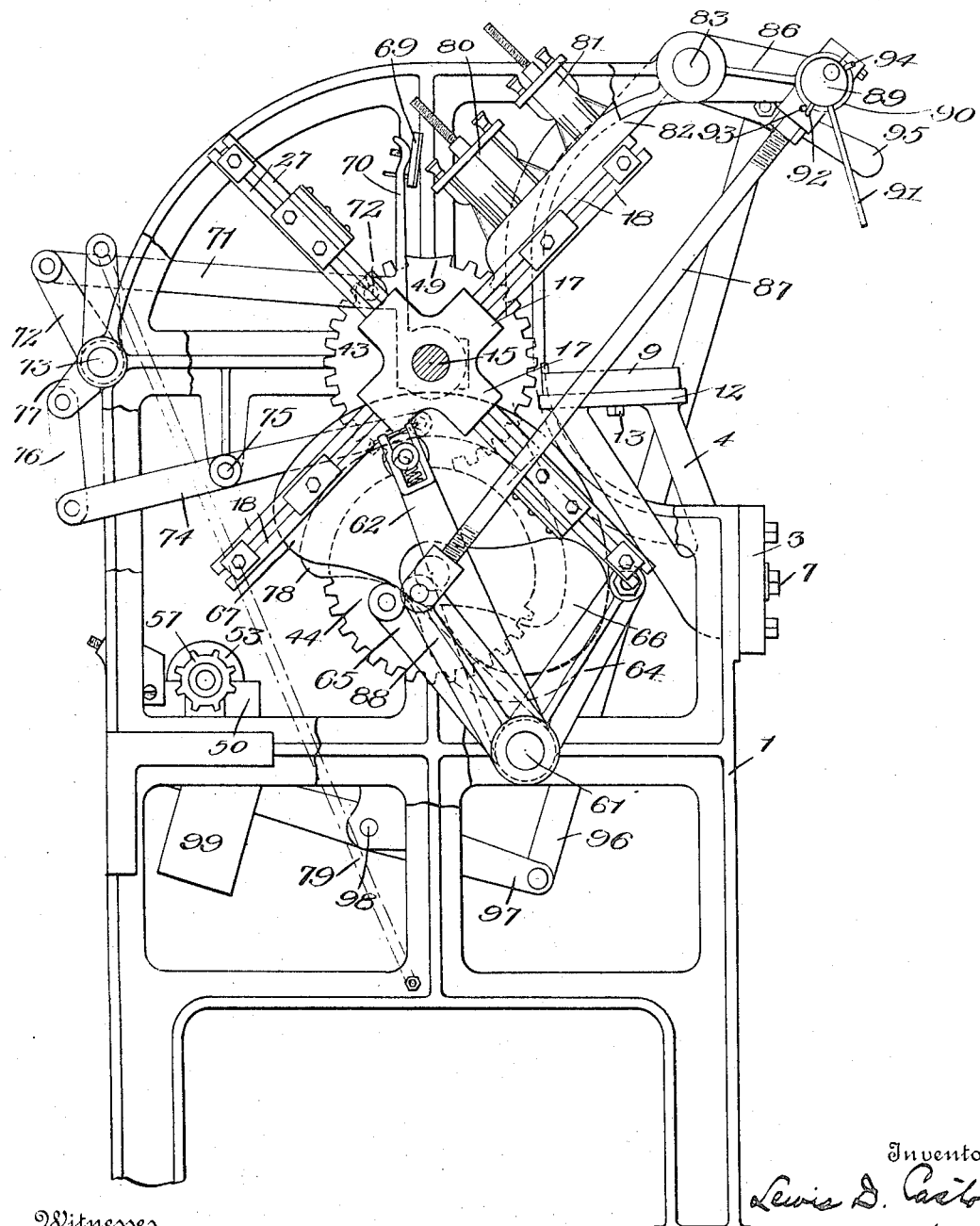

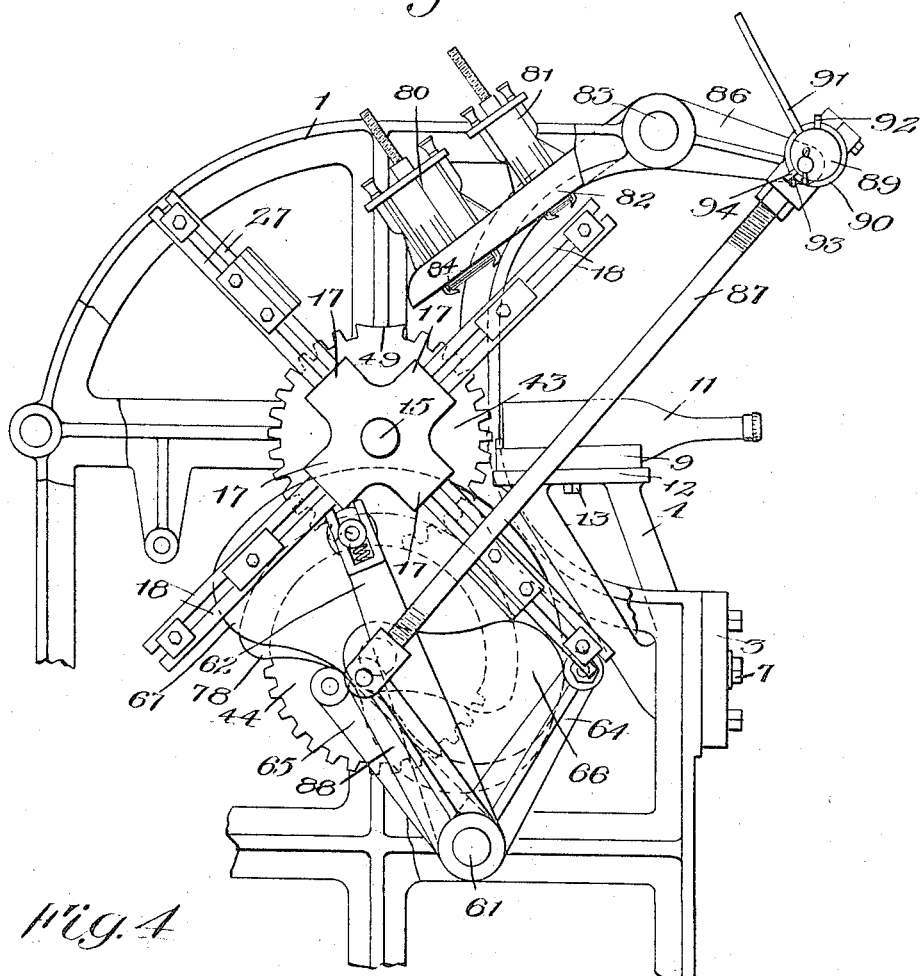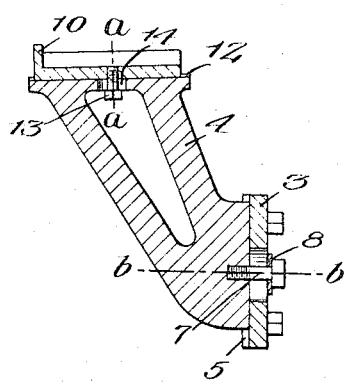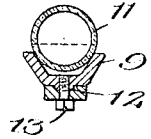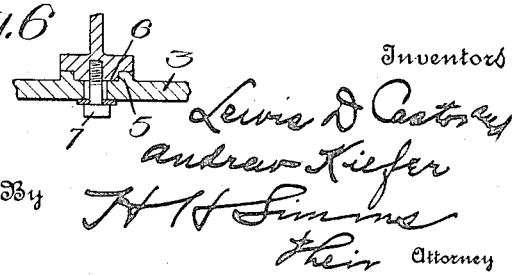

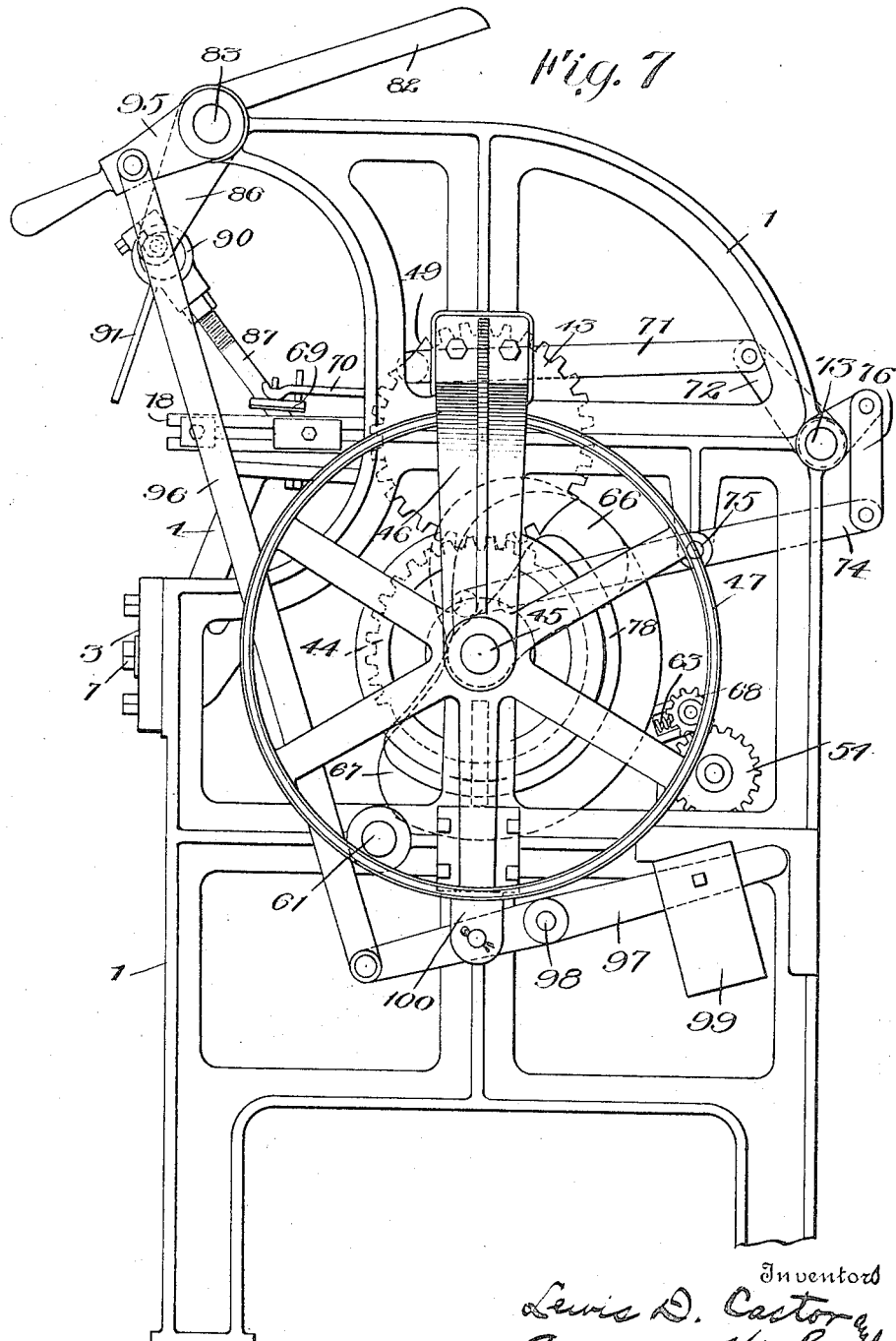

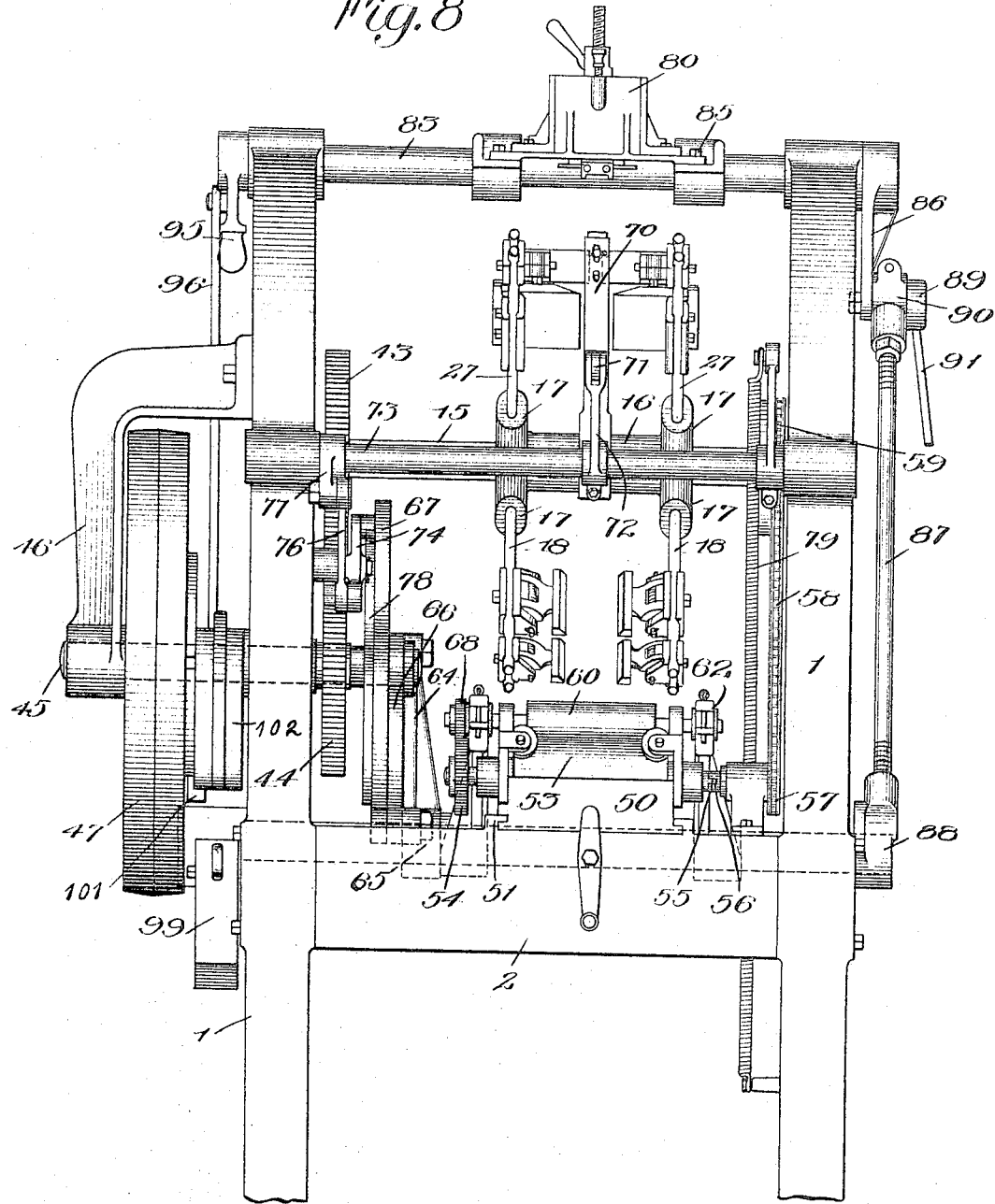

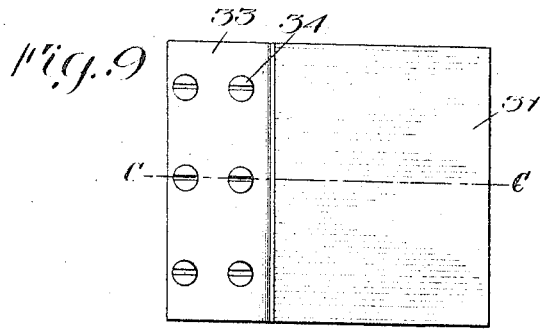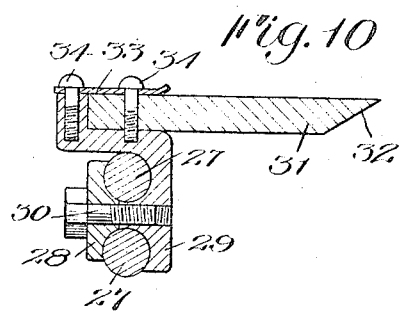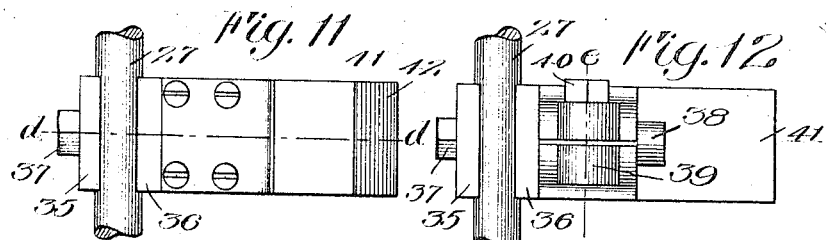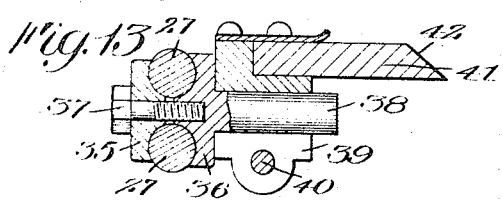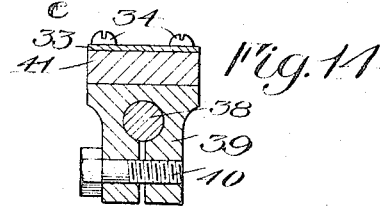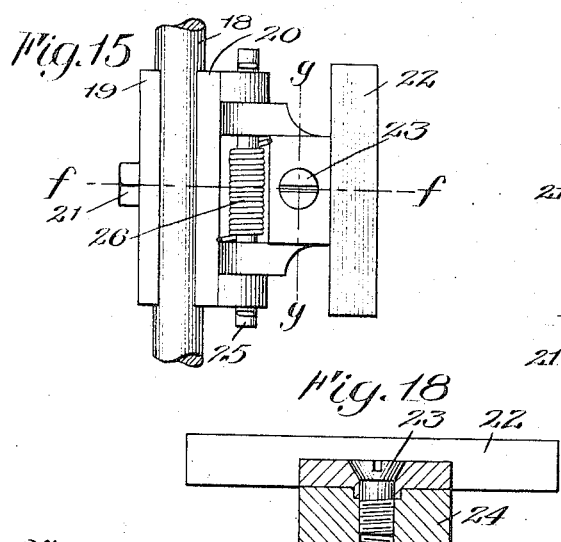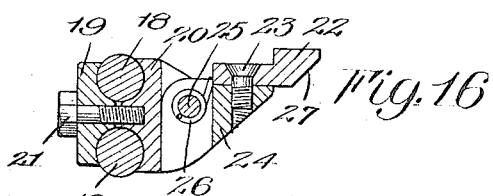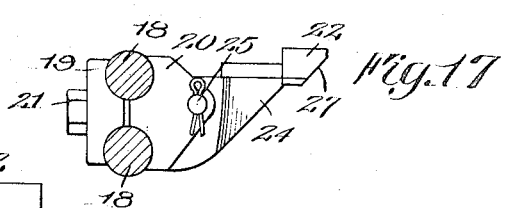

UNITED STATES PATENT OFFICE.

LEWIS D. CASTOR, OF BINGHAMTON, AND ANDREW KIEFER, OF ROCHESTER, NEW YORK, ASSIGNORS OF ONE-THIRD TO SAID KIEFER AND TWO-THIRDS TO EISLER MANUFACTURING COMPANY, BOTH OF ROCHESTER, NEW YORK, A CORPORATION OF NEW YORK.

LABELING-MACHINE.

1,106,925. Specification of Letters Patent. Patented Aug. 11, 1914.

Application filed April 20, 1912. Serial No. 692,026.

*To all whom it may concern:*

Be it known that we, LEWIS D. CASTOR, of Binghamton, in the county of Broome and State of New York, and ANDREW KIEFER, of Rochester, in the county of Monroe and State of New York, have invented a new and useful Improvement in Labeling-Machines, which improvement is fully set forth in the following specification and shown in the accompanying drawings.

The present invention relates to labeling machines for the labeling of bottles, cans or receptacles of any kind together with articles of similar form, an object of the invention being to provide a simple and inexpensive structure which at the same time has a maximum capacity.

Another object of the invention is to provide a construction in which all sliding operating parts are eliminated.

Still another object of the invention is to provide a simple and inexpensive structure which will permit the machine to be adjusted to accommodate articles of different sizes.

To these and other ends the invention consists in certain parts and combinations of parts all of which will be hereinafter described, the novel features being pointed out in the appended claims.

In the drawings: Figure 1 is one side view of the machine showing the label holders and the pasting device about to coöperate with the pick-ups; Fig. 2 is a side view with parts of one side frame broken away and illustrating the positions of the parts of the machine when the label holders are coöperating with the pick-ups; Fig. 3 shows the driving connection of the label holders so adjusted that the latter will not coöperate with the pick-ups, only the upper portion of the machine being illustrated and parts of one of side frames being broken away; Fig. 4 is a vertical section through the work holder or support; Fig. 5 is a section on the line *a—a* Fig. 4; Fig. 6 is a section on the line *b—b* Fig. 4; Fig. 7 is a side elevation of that side of the machine opposite the one shown in Fig. 1; Fig. 8 is a rear view of the machine; Fig. 9 is a top view of one of the body wipers; Fig. 10 is a section on the line *c—c*, Fig. 9; Figs. 11 and 12 are respectively a top and a bottom view of one of the neck wipers; Fig. 13 is a section on the line *d—d* Fig. 11; Fig. 14 is a section on the line *e—e* Fig. 12; Fig. 15 is a top view of one of the body label pick-ups; Fig. 16 is a section on the line *f—f* Fig. 15; Fig. 17 is a side view of one of the body pick-ups; and Fig. 18 is a section on the line *g—g* Fig. 15.

According to this invention there may be provided a main frame of any suitable construction, but in this instance it comprises two side pieces 1 connected at the rear by a horizontal tie piece 2 and at the front by a horizontal tie piece 3. The front piece 3 may serve to sustain the work support which may embody an arm or bracket 4 vertically adjustable on such front piece. In this instance, the inner or rear face of the front piece is provided with a vertical way 5 for the receptacle of a guide piece 6 on the arm or bracket 4, the guide piece with the bracket being secured in its adjusted position by a screw bolt 7 operating within a vertical slot 8 in the cross piece 3 of the frame and serving to draw the bracket firmly to the cross piece. The upper surface of the bracket or arm 4 carries the bottle engaging member 9 which is in the form of a trough open at its forward end and closed at 10 at its rear end to provide a stop for coöperation with the end of a bottle as indicated at 11. The trough shaped bottle engaging member 9 may be adjustable horizontally on the bracket 4, and, to this end, the upper surface of the bracket is provided with a grooved way 12 receiving a coöperating portion of the bottle engaging member, which is held to the bracket by a bolt 13 operating the slot 14 in the bracket, said slot extending in a direction parallel with the length of the way 12.

The labels are fed to the bottles by one or more sets of pick-up devices, two, in this instance, being illustrated and being mounted upon a single shaft 15 which is journaled in the side pieces 1 at a point in rear of and substantially in a plane with the bottle engaging member 9, the adjustment of the bracket 4 permitting the longitudinal axis of a bottle to be adjusted so that it substantially intersects the axis of the shaft 15. In this instance, two hub members 16 are secured to the shaft 15 and each has a series of radial arms 17 extending therefrom, there being, in this instance, four of the said arms in each series. Two of said arms 17 in each series are provided with guides in the form of two rods 18 on each arm, the guide thus formed being radial to the axis of the shaft 15. On each pair of rods 18 is one or more pick-ups, two in this instance being employed, and each extends toward the pick-ups on a pair of rods 18 of the other series of arms 17, so that, when the shaft 15 is rotated, the pick-ups will travel in a path to engage the bottle 11 and coöperate with the bottle in such a manner that two of them act simultaneously on a bottle directly in line on opposite sides of such bottle. Of course, when more than one pick-up is arranged on each pair of rods 18, the bottle will be engaged at different points in the direction of its length.

The construction of the several pick-ups on each pair of rods is, in this instance, the same except that one is larger than the other, the larger one coöperating with the body of the bottle, and the smaller one with the neck of the bottle. One of the pick-ups is shown in detail in Figs. 15 to 18 and comprises two clamping members 19 and 20 coöperating respectively with the outer and inner faces of the rods 18 and held together by a bolt 21 located between the rods 18. The member 20 carries a pick-up element 22 which is preferably removably secured by a bolt 23 to a swinging member 24 turning on a pin 25 on the member 20. A helical spring 26 surrounds the pin 25 and tends to hold the member 24 with the pick-up element 22 in the position shown in the detail figures but permits said pick-up element 22 to yield upwardly when the inclined face 27 coöperates with a bottle. The labels are each placed upon the top surfaces of a pair of pick-up elements operating upon opposite sides of the bottle and are carried to the bottle and placed on the latter by said pick-ups. The shaft 15 may also carry the wipers and, to this end the remaining radial arms 17 on the shaft 15 may be provided with guide rods 27 so that the shaft carries two pairs of wiper guides having the members of each pair operating on opposite sides of the bottle support. Each guide 27 may be provided with a number of wipers corresponding to the number of pick-ups on the rods 18. In this instance, a body and a neck wiper are carried by each guide, the body wiper being illustrated by Figs. 9 and 10 and the neck wiper being illustrated in Figs. 11 to 14 inclusive. Each body wiper embodies two clamping members 28 and 29 coöperating respectively with the outer and the inner faces of two rods 27, these members being held to the rod by a clamping bolt 30. On the member 29 is arranged a wiper device 31 in the form of a plate of rubber or other yielding material having its outer edge beveled on one side at 32 and its inner edge secured by a plate 33 which is anchored to the member 29 by screws 34. Each neck wiper comprises preferably two clamping members 35 and 36 coöperating respectively with the inner and outer faces of two rods 27 nearer to the free ends of said rods than the body wipers and held together by a clamping bolt 37. In order to correspond to the taper of the neck of the bottle so as to give a proper wiping action, the neck wipers are adjustable at an angle to the plane of the body wipers that coöperate with the bottle at the same time therewith. In this instance, the member 36 is provided with a bearing 38 on which a split collar or sleeve turns, a bolt or screw 40 serving to clamp the collar or sleeve 39 to the bearing 38. The sleeve or collar 39 carries the neck wiping device 41 in the form of rubber or other yielding material and the free edge of this material is beveled on one side at 42 to make the free edge of the wiper device more yieldable.

From the foregoing it will be noted that, when the shaft 15 is rotated, a bottle on the supporting device 9 will first be engaged by the pick-ups to deposit a label or labels on said bottle and then be engaged by the wipers which will press the label or labels upon the bottle. The mechanism for effecting movement of the shaft and consequently of the pick-ups and the wipers comprises preferably two mutilated gears, one of which is indicated at 43 and is secured to the shaft 15 and the other of which is indicated at 44 and is secured to the main drive shaft 45, the latter being journaled in one of the side frames 1 and extending from one side of such side frame where it is supported at its outer end by a depending bracket 46. A drive wheel 47 is mounted to turn loosely on the outer portion of the shaft 45 and is adapted to be connected therewith by a clutch 102 of any suitable construction. The mutilated gear 43 has its teeth extending completely around the same except at small diametrically opposite points 49 where it is provided with elongated teeth having concaved outer ends. The mutilated gear 44 has its teeth removed from over half of the circumference thereof and this smooth or mutilated portion conforms to the curve of the outer ends of the teeth 49. The toothed portion of gear 44 is about as great as either one of the toothed portions of gear 43. With this arrangement, whenever the toothed portion of the gear 44 engages with one of the toothed portions on the gear 43, the common carrier for the wipers and the pick-ups will be partially rotated and, during this rotation, the bottle will be supplied with a label or labels by the pick-ups and the wipers will press the label or labels upon such bottle; whereas, when the mutilated portion of the gear 44 coöperates with the concaved end of the tooth 49, the rotary carrier will stand still, and, during this time, the pick-ups may be coated with an adhesive and the labels may be fed to such pick-ups.

With the object in view of coating the pick-ups with paste or other adhesive, there may be employed a pasting device comprising preferably a pot or container 50 arranged below the pick-ups and at the rear of the machine, it being, in this instance, slidably mounted on ways 51 formed on the top of the cross piece 2. Operating within the paste or glue pot is a roller 53 which has its ends projecting from opposite sides of such paste pot. One of the projecting ends is provided with a pinion 54, whereas the other end is provided with a clutch member 55, in this instance, in the form of a rib at the end of the roller shaft. Arranged on the cross piece 2 is a stub shaft 56 having a clutch face in the form of a groove for coöperation with the rib 55. Also arranged on the stub shaft is a sprocket wheel 57 which is, by means of a sprocket chain 58, connected with the sprocket wheel 59 on the shaft 15 so that the pasting roller 53 is intermittently driven. Periodically coöperating with the pasting roller 59 is a pasting roller 60 which, in this instance, is arranged on a movable frame comprising a rock shaft 61 having two arms 62 rigidly secured thereto and extending from the shaft in parallel relation, their outer ends carrying yielding bearing members 63 in which the roller 60 is journaled. Also extending from the shaft 61 are arms 64 and 65 which respectively coöperate with cams 66 and 67 arranged upon the drive shaft 45 so that the shaft 61 can be oscillated without the employment of grooved cams or springs. The cams 66 and 67 shift the arms 62 so as to carry the roller 60 over the pick-up elements 22 of the pick-ups when the rotary carrier is stationary. It is apparent that the pick-ups do not yield during this action but that the roller partakes of the yielding movement while traveling over the pick-ups. When the roller 60 engages the roller 53, the pinion 54 on the roller 53 meshes with a pinion 68 on the shaft of the roller 60 and, in this way, the entire surface of the roller 60 is coated with paste.

To the end of retaining a label on the bottle after such label has been placed thereon by the pick-ups, there may be employed a label retainer comprising preferably a pad 69 loosely supported near the free end of an arm 70 which is adapted to rock on the shaft 15 between the sleeves or hub members 16. This arm may be actuated in any suitable manner. In this instance, a link 71 is pivoted at 72 to a laterally offset portion on the upper side of the arm 70 and to an arm 72 on the rock shaft 73 arranged at the rear end of the machine, this rock shaft being, in this instance, actuated by means of a lever 74 pivoted intermediately of its ends at 75 and having one end connected by a link 76 with an arm 77 on the rock shaft 73 and its other end coöperating with a cam 78 also arranged upon the shaft 45. The cam 78 is so formed that, about the time the pick-ups deposit the label upon the bottle, the retainer 69 coöperates with such label and holds the same in engagement with the bottle until such a time that the wipers have completed their wiping action. A spring 79 acts on the rock shaft 73 to hold the lever 74 in coöperation with the cam 78 and at the same time permits the pad 69 to accommodate itself to bottles of different sizes.

The label holder is mounted to move relatively to the pick-ups and preferably in an arcuate path which intersects the circular path of travel of the pick-ups. In this instance, two label holders 80 and 81 are provided and are arranged upon a common carrier 82 which, preferably, is rigidly secured to a shaft 83 journaled at the front of the machine above the work support and the rotary carrier. Each label holder may be of any desired construction being, in the present instance, in the form of an open-ended chamber having retaining devices 84 at one end which prevent the withdrawal of the labels from the chamber except when their action is overcome by the adhesive material on the pick-ups. Any suitable form of follower may be employed. The common carrier is in the form of two angle arms extending from the shaft 83 and having the label holders supported at opposite sides by said arms. Bolts 85 secure the holders in place and permit the adjustment of the label holders relatively to each other to correspond with the distance between the pick-ups for the body and the neck of the bottle. The operating means for the label holder carrier may comprise an arm 86 extended from the shaft 83 and connected by a pitman rod 87 with an arm 88 on the shaft 61 so that the pasting mechanism and the label holder are operated together when the rotary carrier for the pick-ups is stationary.

It is desirable at times, to wit, when no bottle is in position upon the work support and the machine is in operation, to stop the feeding of labels from the label holder and, to this end, the arm 86 has an eccentric 89 rotatable thereon and turning in the ring 90 on the pitman 87, the eccentric being provided with a hand piece 91 permitting the manual operation of the eccentric. When the eccentric is in the position shown in Figs. 1 and 2 with its stop 92 in coöperation with one side of a stop 93, the pitman effects a movement of the label carrier 82 which will cause the labels to be deposited upon the pick-ups but, when the stop 94 on the eccentric 89 coöperates with the opposite side the stop 93, the movement of the carrier 82 will be so changed, as seen in Fig. 3, that the label holders will not deposit labels upon the pick-ups.

With the purpose in view of controlling the machine from the front part thereof, there may be provided a hand piece or arm 95 turning loosely upon one end of the shaft 83 and connected by a link or rod 96 with one arm of the lever 97 which is pivoted intermediately of its ends at 98 on that side of the machine in proximity to the drive wheel 47 and carries a weight 99 adjustable thereon. A clutch controller 100 is connected to the arm and is movable into and out of the path of a portion 101 on the clutch 102, said portion 101 making and breaking connection between the drive pulley 47 and the drive shaft 45.

The operation of the invention will be understood from the foregoing description but it may be summarized as follows: Assuming the machine to be stationary, the lever 95 is turned to effect connection between the drive wheel 47 and the drive shaft 45. If the parts have been in the position shown in Fig. 1, the label holder carrier 82 will move toward the proximate pick-ups while, at the same time, the pasting roller 60 will move upwardly over those pick-ups in proximity thereto. After the label holder and the pasting roller have completed their operation and moved back to the positions shown in Fig. 1, the rotary carrier with the pick-ups and wipers is moved toward the bottle on the work supporting device 9, the pick-ups first engaging the bottle to deposit the labels thereon and the wipers then engaging the labels and firmly pressing the latter into engagement with the bottle. About the time that the pick-ups operate on the bottle, the holder or retainer 69 engages the body label between the pick-ups and maintains such engagement until after the wipers have operated upon the label. After the wipers reach the position shown in Fig. 1, the carrier stops and the pick-ups are again acted upon by the pasting device and the label holder. If for any reason it is desired that the label holders shall not feed the pick-ups, the eccentric 89 is shifted, thus causing the movement of the label holders to be limited so as not to coöperate with the pickups.

A labeling machine constructed in accordance with this construction is simple in its operation and inexpensive to manufacture. The movements of the pick-ups, the wipers and the label holders are all swinging or rotary so that all expensive slides or guides are eliminated. After the pick-ups and the wipers have coöperated with the bottle they will move downwardly and upwardly in an endless path so that it is possible to employ a plurality of sets of pick-ups and wipers without interference, thus adding materially to the capacity of the machine.

Another feature of this invention is the movement of the label holder in a path which intersects the path of movement of the pick-ups, and this is particularly advantageous when the path of movement of the pick-ups is a circle and the path of movement of the label holders is an arc which intersects said circle.

What we claim as our invention and desire to secure by Letters Patent is:

1. In a labeling machine, the combination with a label holder, of a label pick-up mounted to travel in an endless path and supporting the label in a plane transverse to its path of travel, and a work support for holding the work in the path of travel of the pick-up, said pick-up carrying a label to the work support.

2. In a labeling machine, the combination with a work support and a label holder, of a pick-up rotatable in a complete circle to carry a label from the label holder to the work support, the engaging faces of said pick-up being radial to the turning axis and the work support being arranged so that the pick-up passes transversely of the work to apply labels to such work.

3. In a labeling machine, the combination with a pick-up mounted to turn about an axis, the engaging faces of said pick-up being radial to the turning axis, of a pasting mechanism arranged to coöperate with the pick-up at one point in the travel of the latter, a movably mounted label holder arranged to coöperate with a pick-up at another point in the travel of the latter, and a work support to which the pick-up moves to carry a label from a label holder, the work support being arranged so that the pick-up passes transversely of the work.

4. In a label holder, the combination with a work support, of a rotary carrier embodying two arms arranged to travel on opposite sides of an article on the work support, pick-up devices arranged on said arms, the engaging faces of said pick-up being radial to the turning axis and the work support being arranged so that the pick-ups pass transversely of the work, and a movably mounted label holder for feeding labels to the pick-ups.

5. In a labeling machine, the combination with a work support, of a rotary carrier having a plurality of pairs of arms, the members of each pair being arranged to travel on opposite sides of an article on the work support, pick-up devices arranged at the sides of said arms to hold a label in a plane substantially parallel with the plane of said arms, a movably mounted label holder for coöperating with the pick-up devices when such devices reach a certain point in their travel, and a pasting mechanism for coöperating with the pick-up devices when said devices reach another point in their travel.

6. In a labeling machine, the combination with a work support, of a rotary carrier having a pair of radially extending arms, pick-up devices arranged at the sides of said arms for presenting a label to an article on the work support, mechanism for intermittently rotating the carrier, and a label holder movable into and out of the path of said arms for coöperation with the pick-ups while the carrier is stationary.

7. In a labeling machine, the combination with a rotary carrier having a pair of arms extending therefrom, each arm being provided with a longitudinal guide, of a pick-up device adjustable on said guide, a label holder with which the pick-up device coöperates, and a work support to which the labels are fed by the pick-up.

8. In a labeling machine, the combination with a rotary carrier of a pick-up device adjustable on said carrier toward and from the axis of the latter, a label holder for coöperation with the pick-ups, and a work support to which the labels are fed by the pick-up.

9. In a labeling machine the combination with a rotary carrier, of a pair of pick-ups adjustable on said carrier relatively to each other and toward and from the axis of turning of said carrier, label holders for coöperating with the pick-ups, and a work support to which the labels are fed by the pick-ups.

10. In a labeling machine, the combination with a carrier mounted to turn on a suitable axis and having pick-up devices thereon, of a label holder for feeding labels to the pick-up devices, a vertically adjustable bracket, and a work holder horizontally adjustable on said bracket and located substantially in a horizontal plane with the axis of the rotary carrier.

11. In a label holder, the combination with a frame, of a carrier mounted to turn about a horizontal axis thereon and having a pair of arms each carrying a pick-up device adjustable toward and from the axis of turning of the carrier, a bracket vertically adjustable on said frame, a work holder horizontally adjustable on said bracket, and having the arms of the carrier operating on opposite sides thereof, and a label holder for presenting labels to the pick-ups.

12. In a labeling machine, the combination with the work support, of a rotary carrier, a pick-up device arranged on the carrier and adapted to support a label substantially in a plane radial to the axis of the carrier and to carry such label to the work support, and wiping devices arranged on the carrier for coöperating with opposite sides of the work after the label has been applied thereto by the pick-up.

13. In a labeling machine, the combination with a work support, of a rotary carrier having at least two pairs of arms, pick-up devices arranged on one pair of arms and adapted to support a label in a plane substantially radial to the axis of the carrier, and wiper devices mounted on the other pair of arms and adapted to operate on opposite sides of the work.

14. In a labeling machine, the combination with a work support, and a label holder, of a pick-up movable in an endless path to carry a label from the label holder to the work support, and a wiper adapted to travel in an endless path common to the path of the pick-ups.

15. In a labeling machine, the combination with a work support, a label holder, and a pick-up movable to carry a label from the label holder to the work support, of a swinging member having a pair of arms each formed with a longitudinal guide, and body and neck wipers both adjustable on said guide relatively to each other and to the axis of the swinging member.

16. In a labeling machine, the combination with a work support, and a label holder, of a rotary carrier having at least two pairs of arms, the members of each pair operating on opposite sides of the work support, pick-up devices carried by the members of one pair of arms, and wiper devices carried by the members of the other pair of arms.

17. In a labeling machine, the combination with a work support, and a label holder, of a swinging member having at least two pairs of arms, the members of each pair operating on opposite sides of the work support, pick-up devices arranged on the members of one pair of arms, and wiper devices arranged on the members of the other pair of arms.

18. In a labeling machine, the combination with a work support and a label holder, of movable pick-ups mounted to travel in an endless path for carrying the labels from the label holder to the work support, said pick-ups having movable portions adapted to swing in one direction from normal position to pass over the article on which the label is to be applied, but being held against movement in the other direction from normal position, and pasting means coöperating with the pick-ups with a pressure in the direction in which they are held against swinging.

19. In a labeling machine, the combination with a work support and a label holder, of a rotary carrier having at least two sets of pick-up devices and at least two sets of wiping devices, each of said sets of wiping devices arranged to operate upon the label after one of the sets of pick-up devices has transferred the label from the label holder to the article on the work support, mechanism for rotating the carrier periodically to cause one set of the pick-ups and one set of the wipers to operate, and mechanism for causing the label holder to feed one set of the pick-up devices while the carrier is stationary.

20. In a labeling machine, the combination with a work support, of a rotary carrier having a plurality of pairs of arms, the members of each pair operating on opposite sides of an article arranged on the work support, pick-up devices carried by some of said pairs of arms, wiping devices carried by other of said pairs of arms, mechanism for periodically rotating the carrier to carry one set of pick-ups and one set of wipers past the work support, mechanism for feeding labels to the pick-ups on one pair of arms when the carrier is stationary, and mechanism for feeding an adhesive to the pick-ups on another pair of arms when the carrier is stationary.

21. In a labeling machine, the combination with a work support, of a pick-up mechanism for carrying labels to the work support comprising a rotary carrier having a pair of arms extending therefrom, and pick-ups yieldingly supported on said arms to turn about axes extending in the direction of the lengths of the arms so that after applying the label to the work they will engage the latter on opposite sides and yield to pass the work.

22. In a labeling machine, the combination with a work support and a label holder, of a carrier mounted to rotate in a complete circle and having pick-up devices thereon for holding the label in a plane substantially radial to the axis of rotation of the carrier, said pick-up devices being yieldingly mounted to pass beyond the work, a pasting roller and a swinging member on which said pasting roller is yieldingly mounted to engage the pick-ups with a pressure in a direction opposite to that in which they yield when engaging the work.

23. In a labeling machine, the combination with a work support, and a label holder, of a rotary carrier provided with pick-up devices for taking a label from the label holder and presenting the same to the work support, and pasting mechanism for coöperating with the pick-ups, mounted below the carrier and embodying a paste receptacle having a roller turning therein and driven by the rotary carrier, a swinging frame, and a pasting roller yieldingly mounted on the frame and movable into engagement with the roller of the paste receptacle and also into engagement with the pick-up devices.

24. In a labeling machine, the combination with a work support, of a swinging pick-up mechanism for presenting labels to articles on the work support, said pick-up mechanism supporting the labels on a line radial to the turning axis of the pick-up mechanism, and a holder for a stack of labels movable toward and from the turning axis to intersect the path of movement of the pick-up mechanism.

25. In a labeling machine, the combination with a work support, of a pick-up mechanism mounted to turn about a suitable axis to carry a label to the work support, said pick-up mechanism being adapted to support the label in a plane substantially radial to the turning axis of the pick-up mechanism, and a holder for a stack of labels mounted to turn about a suitable axis to intersect the path of movement of the pick-up mechanism in order to present a label from the stack to the pick-up mechanism.

26. In a labeling machine, the combination with a work support, of a pick-up mechanism adapted to rotate in a complete circle for presenting labels to the work support, said pick-up mechanism being adapted to support a label in a plane substantially radial to the axis of turning of the pick-up mechanism, and a label holder mounted to turn about a suitable axis to present labels to the pick-up mechanism, said label holder moving in the path of intersecting the path of the movement of the pick-up.

27. In a labeling machine, the combination with a work support, of a rotary carrier having a pair of arms extending therefrom and provided with pick-up devices adapted to support a label in a plane substantially radial to the turning axis of the carrier, and a holder for a stack of labels movable in the path to intersect the path of the movement of the pick-up devices in order to present a label from the stack to said pick-up devices.

28. In a labeling machine, the combination with a work support, of pick-up mechanism movable to present a label to an article on the work support, a movable label holder for presenting labels to the pick-up mechanism, and means for limiting the movement of the label holder to prevent the feeding of the pick-up devices.

29. In a labeling machine, the combination with a work support, of a rotary carrier having arms extending therefrom and adapted to travel on opposite sides of the work support, pick-up devices arranged on said arms and adapted to support a label in a plane substantially radial to the axis of turning of the carrier, means for periodically rotating said carrier in a complete circle, an oscillatory holder for a stack of labels, and means for oscillating the label holder into coöperation with the pick-ups when the carrier is stationary.

30. In a labeling machine, the combination with a work support, of a rotary pick-up mechanism for presenting a label to an article on the work support, means for periodically rotating said pick-up mechanism, an oscillatory label holder, means for oscillating said label holder into coöperation with the pick-up mechanism when the latter is stationary, and means for varying the oscillatory movement of the label holder to prevent the coöperation of the latter with the pick-up mechanism.

31. In a labeling machine, the combination with a work support, of a rotary pick-up mechanism for presenting a label to an article on the work support, mechanism for periodically rotating the pick-up mechanism, an oscillatory label holder, and mechanism for operating the latter embodying a pitman, and an eccentric connection between said pitman and the label holder movable to vary the throw of said label holder.

32. In a labeling machine, the combination with a work support, and pick-up mechanism for presenting a label to an article on the work support, of an oscillatory shaft, two arms extending from the shaft, and a label holder adjustable on said arms and adapted to feed a label to the pick-up mechanism.

33. In a labeling machine, the combination with a carrier rotatable in a complete circle and having a pair of arms, of pick-up devices carried by said arms and adapted to support a label substantially in a plane parallel with the plane of the arms, a shaft for supporting said carrier, an arm supported on said shaft between the arms of the carrier and a pad carried by the last mentioned arm to operate between the pick-up devices in order to retain a label in engagement with the work after such label has been applied by the pick-ups.

34. In a labeling machine, the combination with a work support, of a carrier rotatable in a complete circle and having a pair of arms, pick-up devices carried by said arms to operate on opposite sides of an article on the work support and to support a label in a plane substantially parallel with the plane of said arms, an oscillatory arm mounted to turn about an axis common to the axis of the carrier, and a pad carried by said oscillatory arm to engage the label on the work supported by the work support after such label has been applied by the pick-ups.

LEWIS D. CASTOR.
ANDREW KIEFER.

Witnesses:
 HAROLD H. SIMMS,
 ADA M. WHITMORE.